US 7,878,253 B2

(12) United States Patent
Stowe et al.

(10) Patent No.: US 7,878,253 B2
(45) Date of Patent: Feb. 1, 2011

(54) HYDRAULICALLY RELEASED WINDOW MILL

(75) Inventors: Calvin J. Stowe, Bellaire, TX (US); James M. McNicol, The Woodlands, TX (US); Andrew D. Ponder, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 60 days.

(21) Appl. No.: 12/396,986

(22) Filed: Mar. 3, 2009

(65) Prior Publication Data

US 2010/0224372 A1 Sep. 9, 2010

(51) Int. Cl.
*E21B 7/08* (2006.01)
*E21B 23/12* (2006.01)

(52) U.S. Cl. .................. 166/376; 166/381; 166/117.5; 403/31

(58) Field of Classification Search ................ 166/381, 166/376, 313, 50, 117.5, 117.6; 403/2, 31, 403/37, 38, 39; 285/100, 101, 102, 103, 285/104, 922
See application file for complete search history.

(56) References Cited

U.S. PATENT DOCUMENTS

| | | | | |
|---|---|---|---|---|
| 2,298,706 A * | 10/1942 | Kothny | ................. | 166/255.3 |
| 2,506,799 A * | 5/1950 | Livingston | ............... | 166/117.6 |
| 3,115,935 A * | 12/1963 | Hooton | ................... | 166/117.6 |
| 3,339,636 A * | 9/1967 | Frisby | .................... | 166/117.5 |
| 3,383,123 A * | 5/1968 | Murray | ....................... | 285/83 |
| 3,408,890 A * | 11/1968 | Bochman, Jr. | ............. | 411/391 |
| 5,035,292 A * | 7/1991 | Bailey et al. | .................. | 175/45 |
| 5,205,665 A * | 4/1993 | Aronne | ....................... | 403/15 |
| 5,467,820 A * | 11/1995 | Sieber | ..................... | 166/117.6 |
| 5,470,118 A * | 11/1995 | Burton | .................... | 294/86.18 |
| 5,678,634 A * | 10/1997 | Rehbock et al. | ............. | 166/377 |
| 5,826,651 A * | 10/1998 | Lee et al. | ................. | 166/117.6 |
| 5,887,655 A * | 3/1999 | Haugen et al. | .............. | 166/298 |
| 6,102,123 A * | 8/2000 | Bailey et al. | ................ | 166/313 |
| 6,279,659 B1 * | 8/2001 | Brunet | ...................... | 166/313 |
| 6,334,487 B1 * | 1/2002 | Adkins et al. | ............. | 166/55.7 |
| 6,612,383 B2 | 9/2003 | Desai et al. | | |
| 6,648,068 B2 | 11/2003 | Dewey et al. | | |
| 6,695,056 B2 * | 2/2004 | Haugen et al. | .............. | 166/297 |
| 6,939,073 B1 * | 9/2005 | Ahmed et al. | ................. | 403/24 |
| 6,968,903 B2 * | 11/2005 | Pollard | ........................ | 166/382 |

(Continued)

FOREIGN PATENT DOCUMENTS

JP 02204596 A * 8/1990

OTHER PUBLICATIONS

Weatherford International, Inc. Whipback Hydraulic Set Whipstock Operations Procedures, Casing exit training manual, Jul. 27, 1999, pp. 1-18, Technical Publications, Houston, TX.

(Continued)

*Primary Examiner*—Jennifer H Gay
(74) *Attorney, Agent, or Firm*—Cantor Colburn LLP

(57) ABSTRACT

An affixation and release arrangement includes a first component having a fluid pressure chamber. A piston is mounted in the first component and exposed to the fluid pressure chamber. A second component is affixed to the first component through the piston, the piston being responsive to fluid pressure increase within the chamber to unaffix the second component from the first component.

16 Claims, 4 Drawing Sheets

U.S. PATENT DOCUMENTS

| | | |
|---|---|---|
| 7,178,609 B2 | 2/2007 | Hart et al. |
| 7,201,529 B2 * | 4/2007 | Lejeune ........................... 403/2 |
| 7,654,334 B2 * | 2/2010 | Manson ....................... 166/387 |
| 2002/0170713 A1 * | 11/2002 | Haugen et al. ............... 166/298 |
| 2003/0089499 A1 * | 5/2003 | Ohmer ........................ 166/298 |
| 2004/0156669 A1 * | 8/2004 | Lejeune ........................... 403/2 |
| 2010/0012322 A1 * | 1/2010 | McGarian ................... 166/298 |
| 2010/0224372 A1 * | 9/2010 | Stowe et al. ................ 166/377 |

OTHER PUBLICATIONS

Baker Hughes, Baker Oil Tools, Slimhole Casing Exit Systems, For Coiled-Tubing and Thru-Tubing Rotary Drilling, Best in Class, pp. 1-4, www.bakerhughes.com/bot/, Houston, TX.

International Search Report and Written Opinion, Mailed Jul. 30, 2010, International Appln. No. PCT/US2010/026067, Written Opinion 3 Pages, International Search Report 6 Pages.

* cited by examiner

HYDRAULICALLY RELEASED WINDOW MILL

BACKGROUND

In the hydrocarbon industry it is common to run a whipstock and a mill in the same run by hanging the whipstock from the end of the mill string. Generally this is done by using a bolt at an uphole end of the whipstock that runs into the mill to support the weight of the whipstock during run in. Once the whipstock has landed at a selected position and orientation within the borehole, the whipstock is anchored in place and will bear weight. The mill is then separated from the whipstock by set down weight on the bolt that extends from the whipstock to the mill. The bolt is sheared to effect separation. Because the whipstock is necessarily thinner at the uphole end thereof, it has commonly been a practice in the industry to use a lug at the uphole end of the whipstock to support the shear load with minimal distortion of the whipstock. While this arrangement does tend to work as planned, it also presents a heavy piece of material that is significantly less than a full circle thereby guaranteeing an interrupted cut. Such interrupted cuts are known to damage the mill but this has traditionally been endured due to the lack of any alternative arrangement that will function more favorably.

SUMMARY

An affixation and release arrangement includes a first component having a fluid pressure chamber; a piston mounted in the first component and exposed to the fluid pressure chamber; a second component affixed to the first component through the piston, the piston responsive to fluid pressure increase within the chamber to unaffix the second component from the first component.

A method for releasing a mill and whipstock combination including pressuring a piston within a chamber of the mill; loading a fastener with the piston; overcoming the fastener; releasing the mill from the whipstock.

A method for releasing a mill and whipstock combination including pressuring a piston within a chamber of the mill; loading a securement engaged with the piston; overcoming the securement; releasing the mill from the whipstock.

BRIEF DESCRIPTION OF THE DRAWINGS

Referring now to the drawings wherein like elements are numbered alike in the several figures.

DETAILED DESCRIPTION

Figure 1:
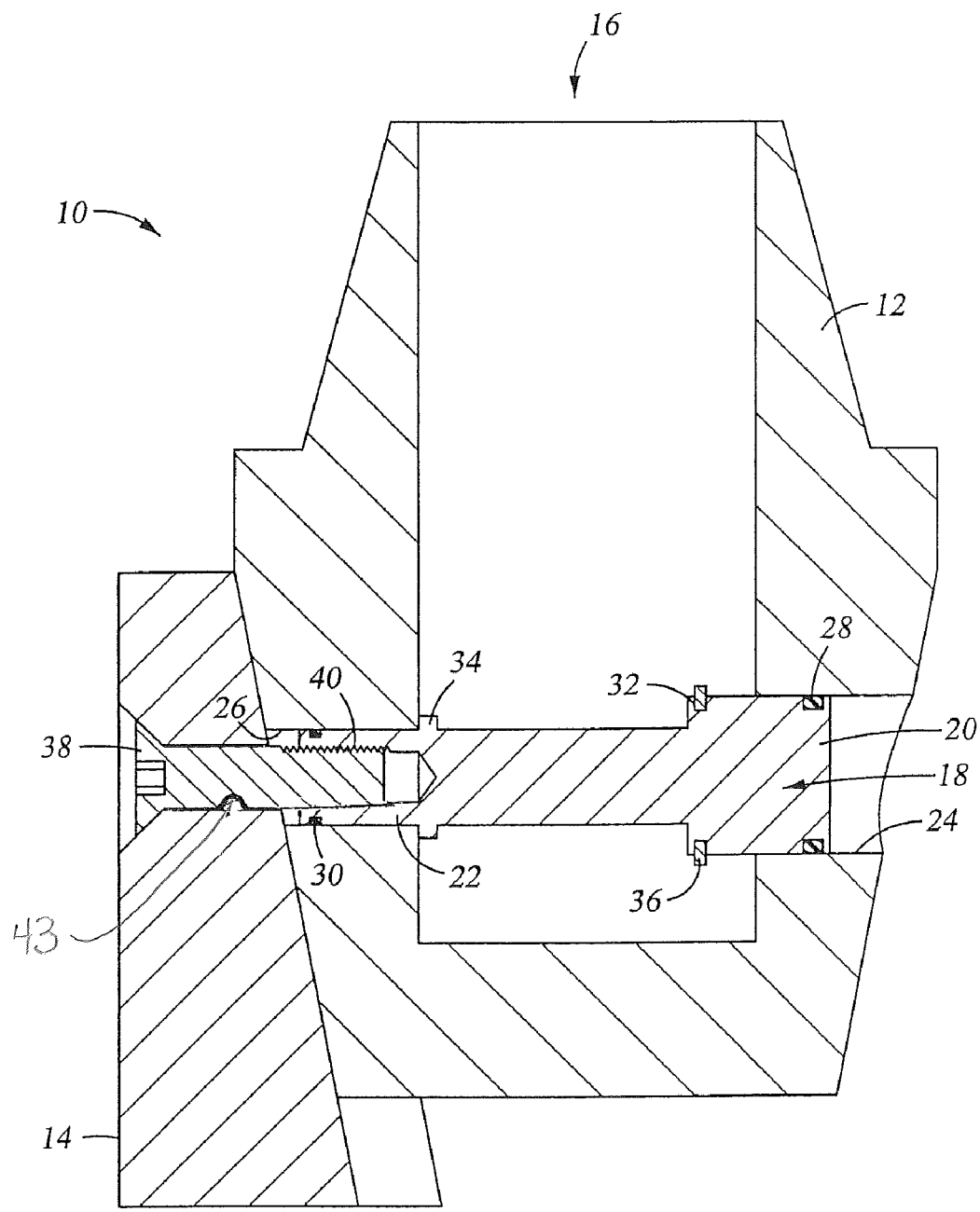
FIG. 1 is a schematic view of a mill connected to a whipstock with a piston actuated affixation arrangement as taught herein.

Referring to FIG. 1 an affixation and release arrangement 10 is illustrated. The specifically depicted embodiment is an affixation between a first component such as a mill 12 and a second component such as a whipstock 14 but it is to be appreciated that the concept hereof can be extended to other affixations that require separation. Referring directly to the Figures, the mill 12 defines a chamber 16 therein. A piston 18 is disposed in pressure communication with the chamber 16 such that a change in pressure in the chamber will cause a change in position of the piston 18. In one embodiment, the arrangement is configured to cause the piston 18 to move upon a pressure increase in the chamber 16. In the illustrated embodiment, this is affected by configuring the piston 18 with a differential area end to end. Hence upon increased pressure, the piston will move. Addressing specifically the differential area of the piston 18, it is noted that in the illustration, the portion of the piston 18 that for convenience is referred to here as piston head 20, on the right side of drawing FIG. 1 is of a dimension that is larger than that of a portion of the piston 18, referred to herein for convenience as piston tail 22. Piston head 20 and piston tail 22 are accommodated laterally in the mill 12 in bores 24 and 26 that are sized to promote fluid pressure sealability with the piston head 20 and piston tail 22, respectively. Sealing is enhanced by the provision of seals 28 and 30 at each of piston head 20 and piston tail 22. In one embodiment the seals 28 and 30 are o-rings. In the condition of piston 18 as described it will be evident to one of ordinary skill in the art that increasing fluid pressure in chamber 16 will cause the piston 18 to move toward the end thereof that is of greater area. In the configuration described above this is toward piston head 20. This also corresponds to the right side of the figure as illustrated.

In order to prevent the piston from moving too far in either direction the illustrated embodiment is configured with stops 32 and 34. These are in one embodiment as illustrated with stop 32 being a snap ring received in a groove 36 and stop 32 being a piece of the piston 18 itself. It will be understood however that these can be reversed or the stop function otherwise accomplished. In the specifically illustrated embodiment the construction is related to ease of manufacture of the arrangement 10 since in this configuration the entire piston 18 is insertable through the bore 24 and then the snap ring 32 may be engaged with the groove 36 through chamber 16. Because in the setting of the illustrated embodiment there is no reason that reengagement would be desired, there is no reason to include a biasing member to urge the piston 18 in a direction opposite that of the direction of movement under increased chamber fluid pressure. It will be appreciated however, that in other embodiments utilizing the same concept as the embodiment illustrated might benefit from a biasing member and hence in such an arrangement a biasing member such as a spring would be located to act in a direction opposite the direction of fluid pressure movement such as in compression between the ring 32 and the chamber wall directly to the right of the ring 32 in the Figure, for example, or might be located to act in a same direction as the direction of fluid pressure movement such as between the stop 34 and the chamber wall directly to the left of the stop 34 in the Figure, for example.

The whipstock 14, for run in, is secured to the mill 12 by a fastener 38 that is in affixed relationship with the piston 18. In one embodiment, the affixed relationship is a threaded or press fit relationship at interface 40 (illustrated in FIG. 1 with the thread as top and the press fit as bottom to be illustrative of the two differing embodiments). In some embodiments the threaded engagement, press fit engagement or the fastener itself may be overcome solely by the pressure based movement of the piston resulting in release of the mill 12 from the whipstock 14. In other embodiments however, it is contemplated that a parting configuration be provided in the fastener. Such parting configurations may present as a groove 43 in the fastener (shown as the bottom only to provide illustration of differing embodiments) to reduce tensile capacity thereof, a heat-treated area for the same purpose, or other similar treatments that will reduce strength of the fastener. In some embodiments the reduction is strength of the fastener will be concentrated in a reduction in tensile strength while substantially preserving shear and/or bending strength. In each case, the parting configuration is configured to cause parting of the fastener 38 below a surface 42 of the whipstock face to ensure that the fastener will not itself present an impediment to mill 12 advancement.

With the fastener 38 secured to the piston 18, through an uphole end of whipstock 14, the whipstock 14 is affixed to the mill 12 and remains that way until the arrangement is actuated by increasing fluid pressure in chamber 16. Fluid pressure can be increased in a number of ways such as by pump or by heaters or by energetic compounds (particularly if the chamber 16 is configured as an enclosed space), etc. and the pressure can be locally generated or remote as desired.

Figure 2:
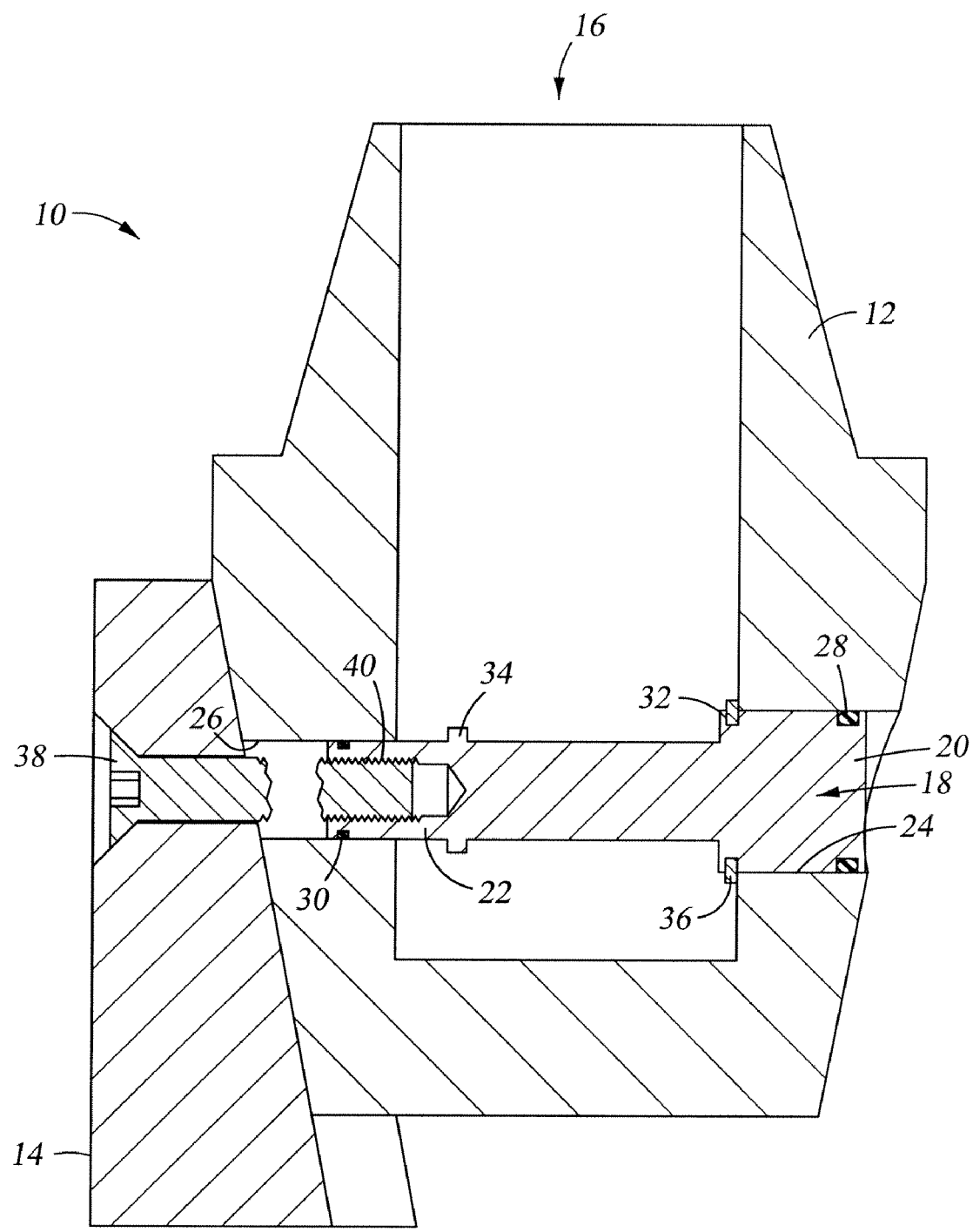
FIG. 2 is a schematic view of the mill and whipstock disconnected by piston actuation.

In use, the arrangement is run into the hole in the condition illustrated in FIG. 1 and located by suitable means. Once the whipstock is at final destination and orientation the pressure is increased in chamber 16 whereby the piston 18 is moved to the right of the drawing Figure and the fastener 38 parts, which is illustrated in FIG. 2. Once the arrangement 10 has achieved the condition illustrated in FIG. 2, the mill 12 is free to move relative to the whipstock 14. Because there is no remaining bolt or lug to be milled off the whipstock 14, there is far less eccentric cut experienced by the mill when advancing to its primary objective. The life of the mill is therefore extended and the job it can do enhanced since it has not experienced a difficult eccentric cut, as has traditionally been the case.

Figure 3:
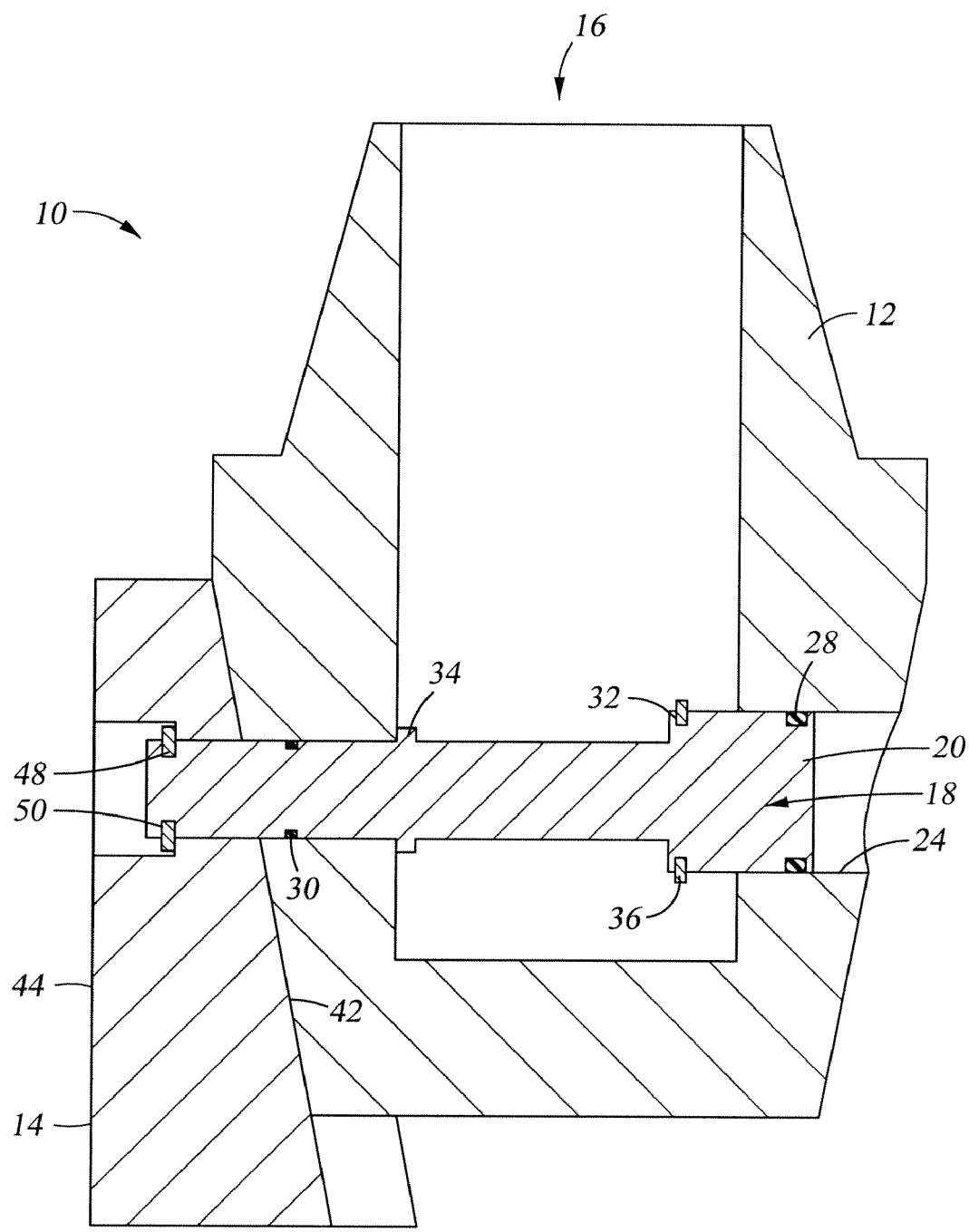
FIG. 3 is a schematic view of an alternate embodiment.
Figure 4:
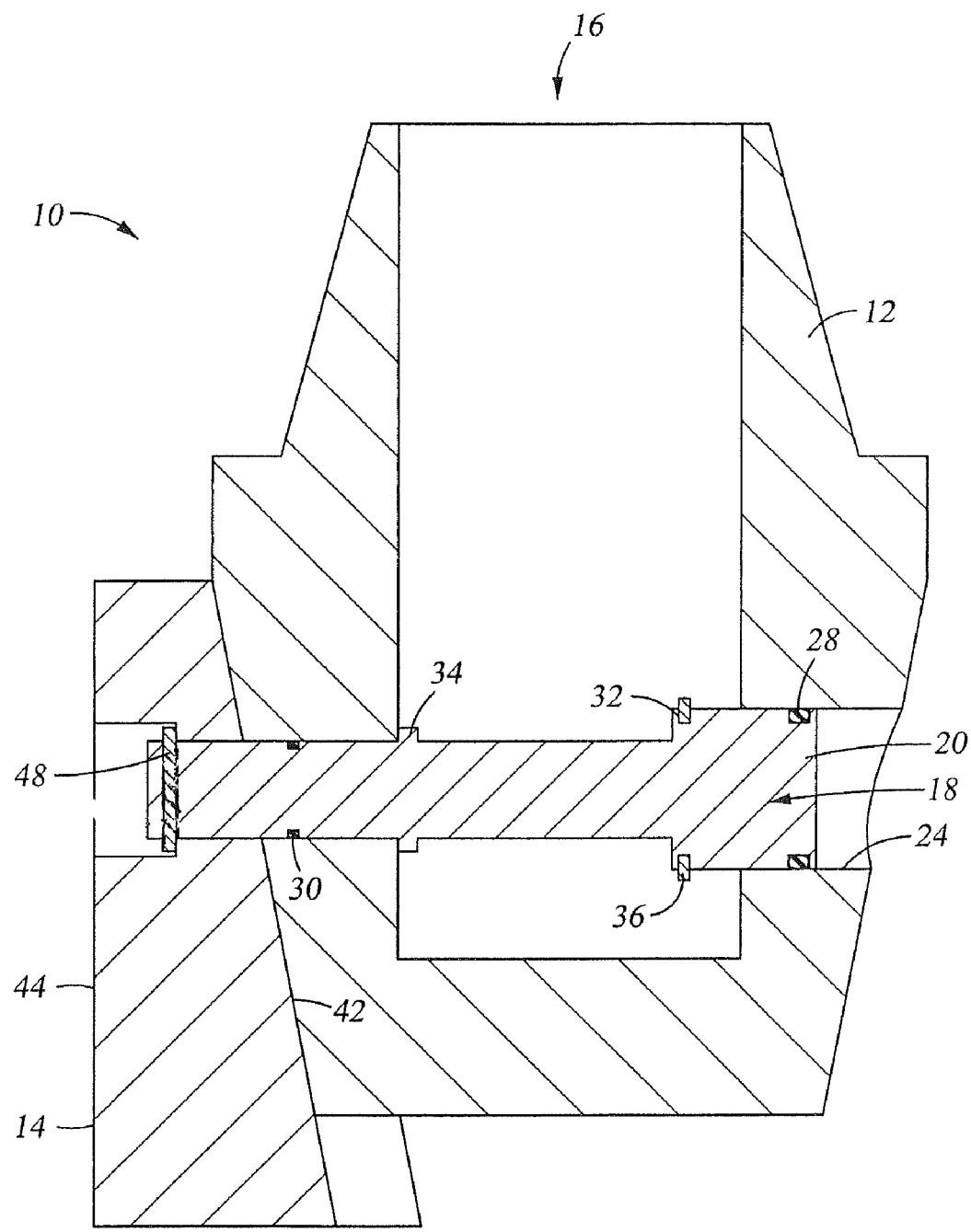
FIG. 4 is a schematic view of an alternate embodiment.

In an alternate embodiment, referring to FIG. 3, the piston 118 is configured differently. The piston 118 itself extends through the whipstock 14 and is secured at an opposite surface 44 to the face surface 42. In the specifically illustrated embodiment, a securement 48 is secured in a groove 50 of the piston 118. This ring 48 may be a snap ring, an e clip, etc. Further the securement 48 may be a roll pin or other similar structure (schematically represented by FIG. 4). In this embodiment, upon the application of fluid pressure within chamber 16, piston 118 is urged as it was in the previously described embodiment but instead of parting the fastener as shown in FIG. 2, the securement 48 is disengaged from the piston 118. Disengagement may be by shear, deformation, etc. as long as it is no longer in a position to hold the piston in place and thereby allows the fluid pressure to move the piston 118 in a direction that will disengage the piston itself from the whipstock (to the right in the figure). In this embodiment, there is no component of the securement left in the whipstock and hence no concern that such component might come loose and interfere with a well operation.

While preferred embodiments have been shown and described, various modifications and substitutions may be made thereto without departing from the spirit and scope of the invention. Accordingly, it is to be understood that the present invention has been described by way of illustration and not limitation.

The invention claimed is:

1. An affixation and release arrangement for a whipstock and a mill in a borehole comprising:
   a mill having a fluid pressure chamber;
   a piston mounted in the mill and exposed to the fluid pressure chamber;
   a whipstock affixed to the mill through the piston, the piston responsive to applied fluid pressure from surface within the chamber to unaffix the whipstock from the mill.

2. An affixation and release arrangement as claimed in claim 1 wherein the whipstock is affixed to the mill by a fastener.

3. An affixation and release arrangement as claimed in claim 2 wherein the fastener is threaded.

4. An affixation and release arrangement as claimed in claim 2 wherein the fastener is a press fit fastener.

5. An affixation and release arrangement as claimed in claim 2 wherein the fastener includes a parting feature.

6. An affixation and release arrangement as claimed in claim 5 wherein the parting feature facilitates parting under tensile load.

7. An affixation and release arrangement as claimed in claim 5 wherein the parting feature preserves fastener strength in at least one of shear and bending.

8. An affixation and release arrangement as claimed in claim 1 wherein the whipstock is affixed to the mill by a securement to the piston.

9. An affixation and release arrangement as claimed in claim 8 wherein the securement is a ring.

10. An affixation and release arrangement as claimed in claim 8 wherein the securement is a pin.

11. An affixation and release arrangement as claimed in claim 1 wherein the piston includes a piston head and a piston tail, the piston head having greater area than the piston tail.

12. An affixation and release arrangement as claimed in claim 11 wherein each of the piston head and piston tail include stops.

13. A method for releasing a mill and whipstock combination from each other comprising;
   pressuring a piston within a chamber of the mill wherein the pressuring is by applied pressure from a surface location;
   loading a fastener with the piston pursuant to the pressuring;
   overcoming the fastener by the loading with the piston;
   releasing the mill from the whipstock as a result of overcoming the fastener.

14. A method as claimed in claim 13 wherein the loading of the fastener is tensile.

15. A method as claimed in claim 13 wherein the overcoming of the fastener is parting of the fastener.

16. A method for releasing a mill and whipstock combination comprising;
   pressuring a piston within a chamber of the mill by applied pressure from a surface location;
   loading a securement engaged with the piston pursuant to the pressuring;
   overcoming the securement by loading with the piston;
   releasing the mill from the whipstock as a result of overcoming the securement.

\* \* \* \* \*